United States Patent [19]

Hyatt et al.

[11] Patent Number: 5,307,463
[45] Date of Patent: Apr. 26, 1994

[54] PROGRAMMABLE CONTROLLER COMMUNICATION MODULE

[75] Inventors: Craig S. Hyatt, Pewaukee; Emmanuel G. D. Hostria, Mukwonago, both of Wis.

[73] Assignee: Allen-Bradley Company, Inc., Milwaukee, Wis.

[21] Appl. No.: 987,104

[22] Filed: Dec. 7, 1992

Related U.S. Application Data

[63] Continuation of Ser. No. 490,907, Mar. 8, 1990, abandoned.

[51] Int. Cl.⁵ ............................................. G06F 13/12
[52] U.S. Cl. ........................ 395/275; 364/DIG. 2; 364/927.92; 364/927.95; 364/927.99; 364/926.93; 364/940; 364/949; 364/949.91
[58] Field of Search ............... 395/325, 200, 275, 325; 364/130, 140, 146, 188

[56] References Cited

U.S. PATENT DOCUMENTS

| | | | |
|---|---|---|---|
| 4,442,504 | 4/1984 | Dummermuth et al. | 395/725 |
| 4,631,666 | 12/1986 | Harris | 395/325 |
| 4,787,028 | 11/1988 | Finfroch | 395/325 |
| 4,858,101 | 8/1989 | Stewart et al. | 395/275 |

Primary Examiner—Debra A. Chun
Attorney, Agent, or Firm—Quarles & Brady

[57] ABSTRACT

A module interfaces a programmable controller to several serial communication networks for the exchange of data carrying messages. A central processor controls the transfer of data between the module and other programmable controller components. The module has a separate port circuit for each of the networks permitting communication using different protocols. Messages received through one port circuit can be routed to another port circuit or other programmable controller components as specified by routing data stored in the module. The module also can be configured to detect when a given sequence of data is contained in a received message or to parse a section of data from the message. In these cases, an indication of whether the data sequence was found or the parsed data is routed to a designated output of the module.

8 Claims, 8 Drawing Sheets

SYSTEM MEMORY MAP

PORT RELATED
CONFIGURATION DATA

ROUTING TASK

PROGRAMMABLE CONTROLLER COMMUNICATION MODULE

This application is a continuation of U.S. patent application Ser. No. 07/490,907, filed Mar. 8, 1990, now abandoned.

BACKGROUND OF THE INVENTION

The present invention relates to programmable controllers which are employed to control the operation of one or more pieces of manufacturing equipment, and more particularly to modules which interface the programmable controller to remote devices using a communication link.

Programmable controllers, such as the one described in U.S. Pat. No. 4,858,101, typically are connected to industrial equipment, such as assembly lines and machine tools, to sequentially operate the equipment in accordance with a stored control program. The control program includes instructions which are read out in rapid sequence and executed to examine the condition of selected sensing devices on the controlled equipment, or to energize or deenergize selected operating devices on the controlled equipment contingent upon the status of one or more of the examined sensing devices.

Many types of sensing devices have been devised for detecting various conditions on the controlled equipment and providing an input signal to the programmable controller. The simplest of these types of devices are switches which send a DC or an AC signal to the programmable controller. Other devices, such as temperature or pressure sensors provide a four to twenty milliampere signal having a magnitude which corresponds to the magnitude of the condition being sensed. Similarly with respect to the operating devices, the programmable controller must be capable of providing a variety of electrical output signals either DC, AC or analog current signals for driving the different types of operating devices on the controlled equipment. In order to provide a programmable controller which can be interfaced to the different types of input and output electrical signals, modularized controllers have been developed which allow the user to place different combinations of input and output modules into the programmable controller to interface with signals for the specific industrial equipment being controlled.

As industrial processes became more complex, a more elaborate sensing and control system was required. In many instances, the simple voltage or current input to and output from the programmable controller was insufficient to communicate the data to and from the processing equipment. In many instances, more sophisticated sensors were devised to provide detailed data about the individual workpieces being handled by the controlled equipment. For example, automobile assembly lines use radio frequency transponder tags mounted either on the automobile or the assembly line carriage for the automobile. As the automobile passes a work station, a transceiver interrogates the RF transponder tag to acquire data about the specific automobile being processed. Such data, for example, identifies the model of car as well as the options and features to be incorporated. Once the transceiver has interrogated the transponder tag, the data regarding the automobile is provided to a programmable controller at the work station over a serial communication link.

A large assembly line is typically controlled by a number of programmable controllers. In which case, serial communication networks also interconnect the programmable controllers allowing them to exchange data regarding the operation of the assembly line. In addition, a central host computer often is coupled to the network to receive assembly line status information from the programmable controllers and issue commands to them. In such installations, sensor data received by one programmable controller may have to be passed on to other programmable controllers or the host computer. For example, rather than locating an RF tag transceiver at every work station, the transceiver can be coupled to the programmable controller for one work station and that controller sends the data read from the tags onto other programmable controllers at adjacent downstream work stations.

Heretofore, serial communication modules for a programmable controller received data from a external device and supplied the data to a central processor module for the programmable controller. If that data was to be forwarded to another programmable controller or a host computer via another communication link, the central processor module had to devote some of its processing time to transferring the data back to the same or a different serial communication module which interfaced to that link. Since the primary role of the central processor module is executing a control program to operate the industrial equipment, handling communication tasks took time away from this role.

Furthermore, a sensing device may provide a long stream of data to the programmable controller, while only a small portion of the stream was needed to carry out the control function. For example, an RF tag system provides detailed information regarding the options to be incorporated in an automobile being assembled, whereas a given work station might only need the model designation. In previous systems, the processor module had to devote part of its processing time to parsing the RF tag data to obtain the model number. This parsing function also took processing time away from the primary machine control function.

SUMMARY OF THE INVENTION

A module provides a communication interface for coupling external input and output (I/O) devices and other remote apparatus to a programmable controller. The module includes several I/O ports to which communication links may be connected. A separate control circuit is provided for each I/O port and has a processor that executes a program to supervise the exchange data between the module and the external devices according to a serial communication protocol defined by this program. The same or different programs may be executed by each port circuit processor, thereby enabling communication using several protocols through different I/O ports, if desired.

A module controller supervises the transfer of data within the module among the I/O ports and backplane bus of a rack for the programmable controller into which the communication interface module is incorporated. The module controller inspects an incoming message and determines if it is destined to be forwarded over another communication link, in which case the message is directed to the I/O port circuit for that other link. The message is relayed without ever being sent over the rack backplane bus and without requiring processing time from the central processor module of the programmable controller. In other instances, the module configuration data may also instruct the module controller to transfer the data to one or more of the I/O ports and the central processor in the programmable controller.

The preferred interface communication module provides the capability of searching the incoming message for a defined sequence of data. When the defined sequence is found, a flag bit is sent to the central processor module via discrete I/O data transfer, rather than sending the entire data message. The communication interface module also can parse the incoming message for a given section of data, which then is sent to the central processor module. These latter features relieve the central processor module of obtaining the entire data message and performing the search and parse operations.

The general object of the present invention is to provide a communication interface module for a programmable controller, which interfaces to several communication links and can exchange data message among the links without requiring the intervention of the central processor module of the programmable controller.

Another object is to incorporate intelligence into the communication interface module so that the module can transfer a received data message according to routing information optionally sent with the message.

A further object of the present invention is to store configuration data in the communication interface module which defines the transfer path of incoming data messages from a given port.

Yet another object is to incorporate a means for detecting a defined data sequence in incoming data to the communication interface module and signalling the central processor of the programmable controller upon the detection.

Still another object is to provide a means for the communication interface module to extract a defined section of data from an incoming message and send only the extracted data to the central processor of the programmable controller or to another I/O port on the module.

DETAILED DESCRIPTION OF THE INVENTION

Figure 1:
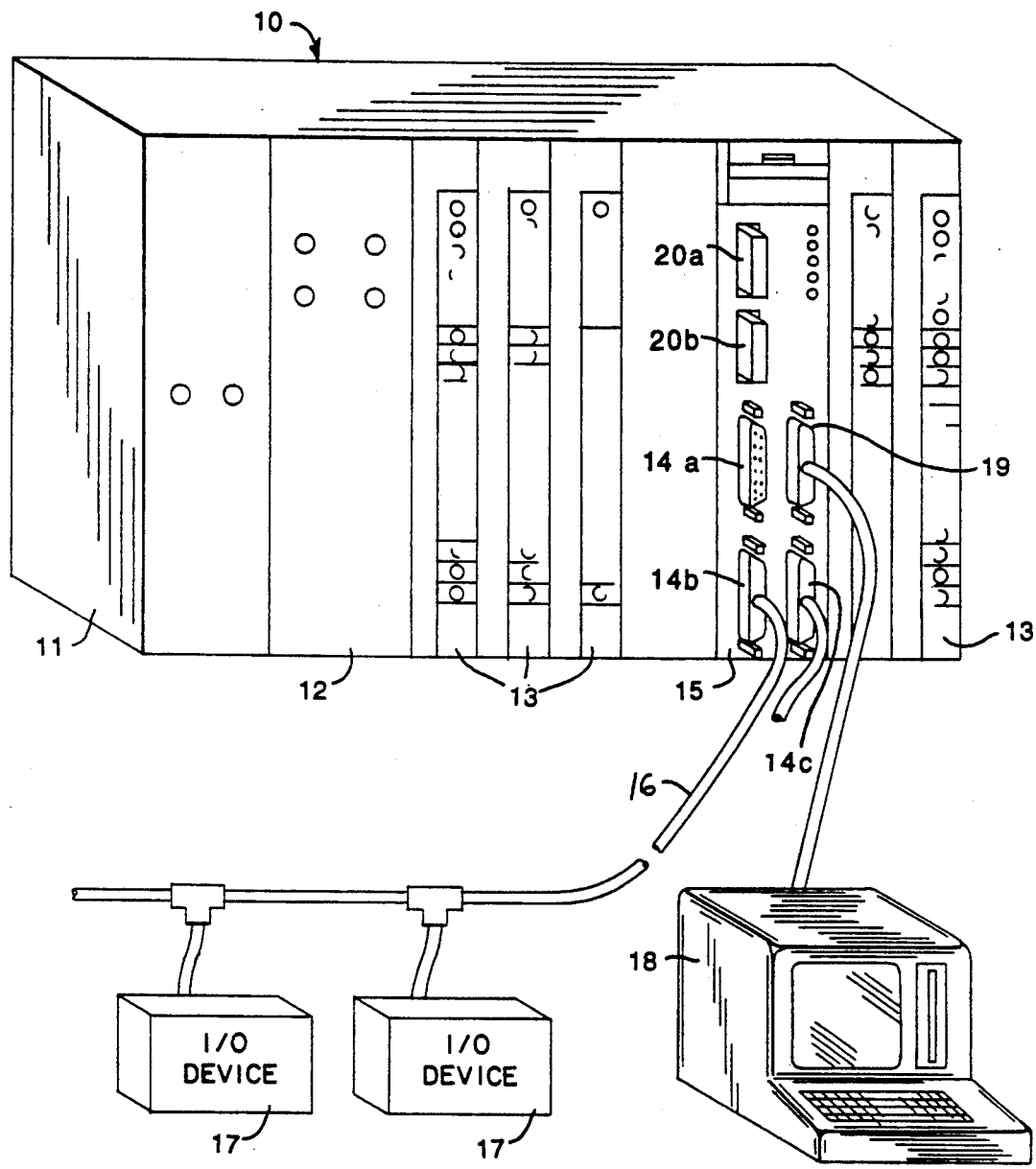
FIG. 1 is a pictorial representation of a programmable controller.

FIG. 1 illustrates a conventional programmable controller 10, such as an Allen-Bradley Company, Inc. 1771 series system, which executes program instructions to operate a machine. The controller 10 includes a rack 11 in which a number of functional modules 12, 13 and 15 are housed and electrically interconnected by a mother board within the rack. The rack 11 includes a power supply which provides electricity to each of the functional modules. A processor module 12 stores and executes a user-defined control program to govern the operation of the machine. Located elsewhere in the rack 11 are a number of input/output (I/O) modules 13 which interface the processor module 12 to sensing and operating devices on the controlled machine. The modularity of the controller allows the user to select a combination of module types to meet the interface requirements of a given application.

One of the functional modules is a communication module 15 which exchanges data between remote devices 17 via a serial communication link 16. Up to three such communication links can be simultaneously coupled to a trio of I/O ports 14a, 14b and 14c on the serial communication module 15. As illustrated different types of sensing and operating devices 17, such as a radio frequency tag transceiver, are coupled to communication link 16 for a bidirectional exchange of data with the programmable controller 10. A second serial communication link to another programmable controller or a host computer (not shown) is connected to I/O port 14c. The communication module 15 also includes a configuration port 19 to which a programming terminal 18 is connected for configuring the module to perform specific tasks. A "dumb terminal" (not shown) also may be connected to one of the I/O ports 14a–c to communicate with the programmable controller.

A unique feature of the communication module 15 is a pair of removable communication protocol cartridges 20a and 20b plugged into sockets through the front panel of the module. Each protocol cartridge stores two software programs for controlling communication via the I/O ports 14a–c. The communication protocol for the module configuration port 19 is permanently programmed into the module.

Module Hardware

Figure 2:
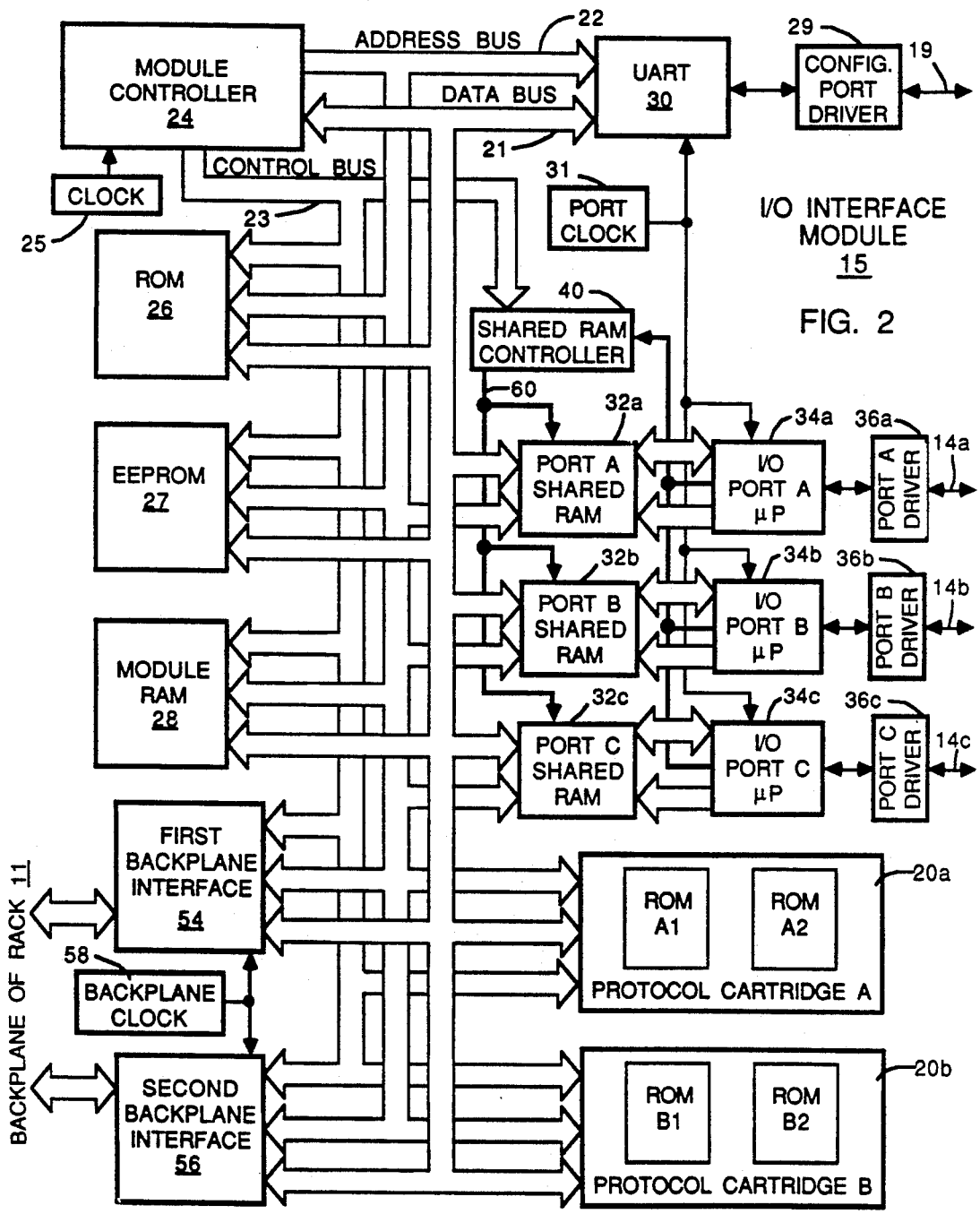
FIG. 2 is a block schematic diagram of a serial communication module incorporating the present invention.

FIG. 2 illustrates the internal components of the communication module 15. The module is built around a parallel data bus 21, a parallel address bus 22 and a set of control lines forming a control bus 23, all of which extend among the components of the module. Coupled to these buses 21–23 is a module controller 24 which supervises the overall operation of the module and the exchange of data among the I/O ports 14a–c and the backplane of the rack 11. The module controller 24 may be an 80C188-10 model microcontroller manufactured by Intel Corp. which includes internal memory, timers, counters, a system clock generator and a system bus controller in one integrated circuit package. The module controller 24 receives timing signals from a clock 25.

In order to supervise the module operation, a read only memory (ROM) 26 stores a program for execution by the module controller 24 and an electrically erasable programmable read only memory (EEPROM) 27 stores configuration data provided to the module 15 via the programming terminal 18. Alternatively, this configuration data may be received by the communication module 15 across the rack backplane from the processor module 13 or a host computer coupled to the programmable controller 10. A module random access memory (RAM) 28 provides storage locations in which the module controller 24 retains different variables and intermediate processing results used in carrying out its control function. Additional storage locations in the module RAM 28 are allocated to store data for other module components, as will be described.

As noted previously, the programming terminal 18 is coupled to the configuration port 19 of the serial communication module 15 in order to supply data defining the module's operation. The configuration port 19 is coupled by a driver circuit 29 to a universal asynchronous receiver/transmitter (UART) 30. The UART is a conventional device which translates the serial data exchanged between the module and the programming terminal 18 into the parallel format of the data bus 21 and the internal components of the module. The UART 30 receives a timing signal from a port clock 31.

The circuitry for each serial I/O port 14a-c includes a separate port microprocessor (μP) 34a-c, such as a 80C32 model device manufactured by Siemens. This microprocessor type includes internal random access memory, UART, timers and parallel I/O ports. The internal UART of each I/O port microprocessor 34a-b is coupled to a port connector on the front panel of the module 15 by a driver circuit 36a-c, respectively. The driver circuits interface the interval electrical signal levels to those which conform to several serial communication standards, such as RS-232, RS-422 and RS-485. For means of reference, the ports 14a, b and c and their related circuitry are also referred to by the letters A, B and C, respectively.

Each I/O port circuit also includes a shared random access memory (RAM) 32a-c which couples the I/O port microprocessor 34a-c to the module data and address buses 21 and 22. Alternatively, dual-ported RAM's can be used instead of shared RAM circuitry. The shared random access memories 32a-b receive a timing signal from port clock 31 and control signals from a shared RAM controller 40, which is coupled to the module controller 24 via the control bus 23 and to the I/O port microprocessors 34a-c. The shared RAM controller 40 consists of three independent circuits for arbitrating access to the three shared RAM's 32a-c between the associated port microprocessor 34a-c and the module controller 24.

Figure 3:
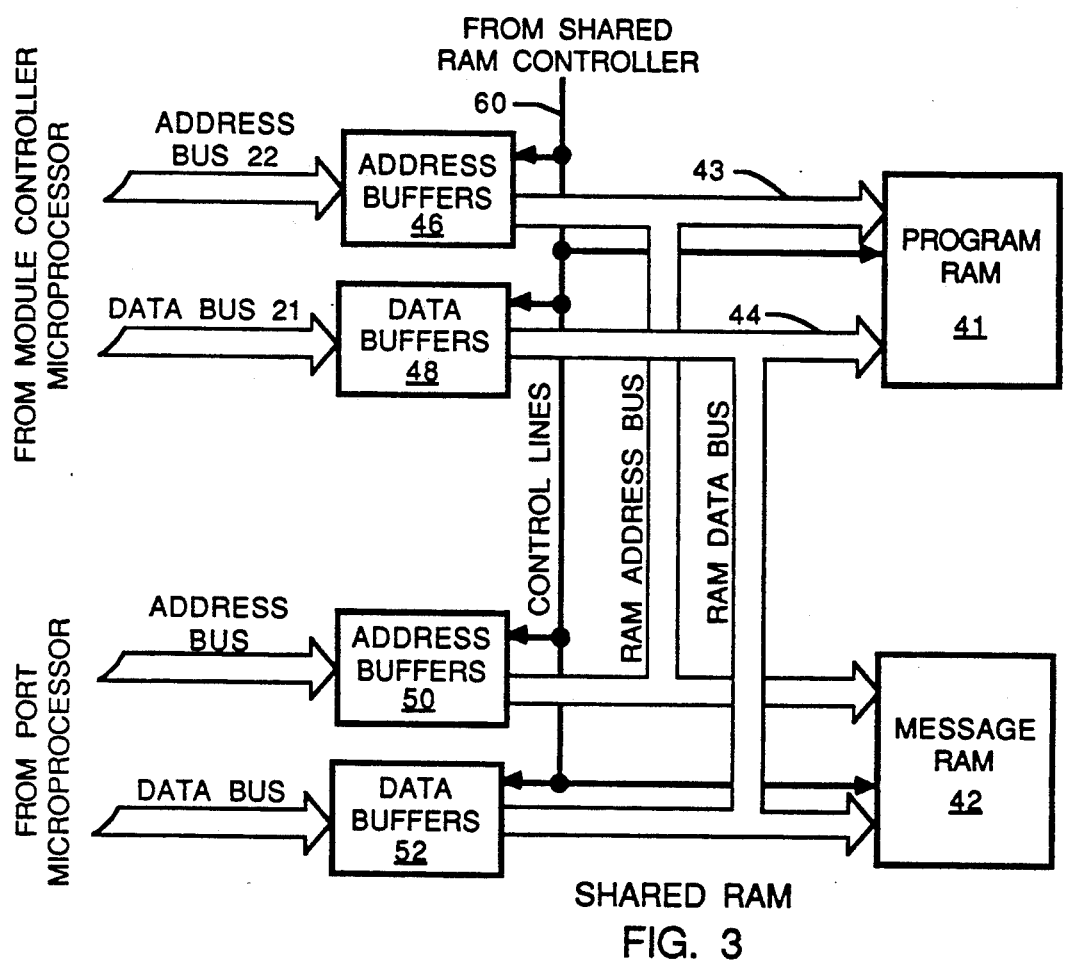
FIG. 3 is a block schematic diagram of a shared random access memory in the module.

The details for one of the port shared RAM's 32a-c are shown in FIG. 3. The shared RAM includes two separate memory devices designated as program RAM 41 and message RAM 42. The program RAM 41 stores the software for the associated I/O port microprocessor 34a-c, which software supervises communication via the port and inherently defines the communication protocol for that port. Hereinafter, this software is referred to as a protocol program. Such programs are similar to those used by other devices for serial communication of data over a network. The message RAM 42 provides storage locations for the data being communicated via the corresponding serial I/O port 14a, b and c. The two RAM's 41 and 42 are connected to an internal RAM address bus 43 and a RAM data bus 44. A first set of address buffers 46 couple the lines of the RAM address bus 43 to the module address bus 22, and a first set of data buffers 48 couple the lines of the RAM data bus 44 to the module data bus 21. Similarly, a second set of address buffers 50 couple the RAM address bus 43 to the address lines from the associated port microprocessor 34a-c, and a second set of data buffers 52 couple the data lines from the associated port microprocessor to the RAM data bus 44. The sets of address and data buffers 46-52 receive separate enabling control signals from the shared RAM controller 40.

As described above, two separate protocol cartridges 20a and 20b can be plugged into the serial communication module 15 to program the three I/O ports with a standard communication protocol. Referring again to FIG. 2, each protocol cartridge 20a and 20b has two read only memories (referred to herein as ROM's A1 and A2, or B1 and B2), within each of which is stored a separate program for execution by a port microprocessor to implement serial communication according to a different protocol. Each cartridge ROM A1, A2, B1 and B2 is coupled to the module data and address buses 21 and 22 and receives signals from control bus 23. The ROM's in the protocol cartridge 20a and 20b may be programmable read only memories into which the communication module manufacturer or the user has stored the protocol programs using conventional programming techniques and equipment. As will be described, one of the protocol programs is executed by each active port microprocessor 34a-c.

The serial communication module 15 occupies two slots within rack 11 and couples to the rack backplane connectors for each of the two slots. Two backplane interface circuits 54 and 56 are connected to the module buses 21-23 to exchange data between the module 15 and other modules of the programmable controller rack 11, principally the processor module 12. The backplane interface circuits 54 and 56 receive timing signals from a backplane clock 58. Any of several well-known backplane interface circuits may be used, such as the one disclosed in U.S. patent application Ser. No. 07/249,415 filed on Sep. 3, 1988 and assigned to the same entity as the present invention. The backplane interface circuits 54 and 56 relieve the module controller 24 of many functions related to communication with the programmable controller processor module 12 or other functional modules 13 over the rack backplane 11 and provide discrete byte and data block transfer capability. For example, the first backplane interface 54 is assigned the task of sending a discrete input byte to the processor module 12 in which each bit represents the result of a processing operation by the communication module 15. As will be described the communication module can be configured to detect a defined sequence of data in messages received through a port and in response set a bit of an input byte to signal the processor module. The second backplane interface 56 is assigned the task of transferring blocks of data, e.g. message data from communication link 16, between the processor module 12 and the communication module 15.

The three I/O ports 14a-c, the configuration port 19 and the two backplane interface circuits 54 and 56 each forms an I/O point at which external devices can interface to the communication module 15.

From the above description of the circuitry for the serial communication module 15, it is apparent that the module utilizes several different memory devices. Some of these devices, such as the ROM 26, EEPROM 27 and module RAM 28 are accessible by only the module controller 24, whereas the shared RAM's 32a-c are accessible by either the module controller 24 or the associated I/O port microprocessor 34a-c.

Figure 4:
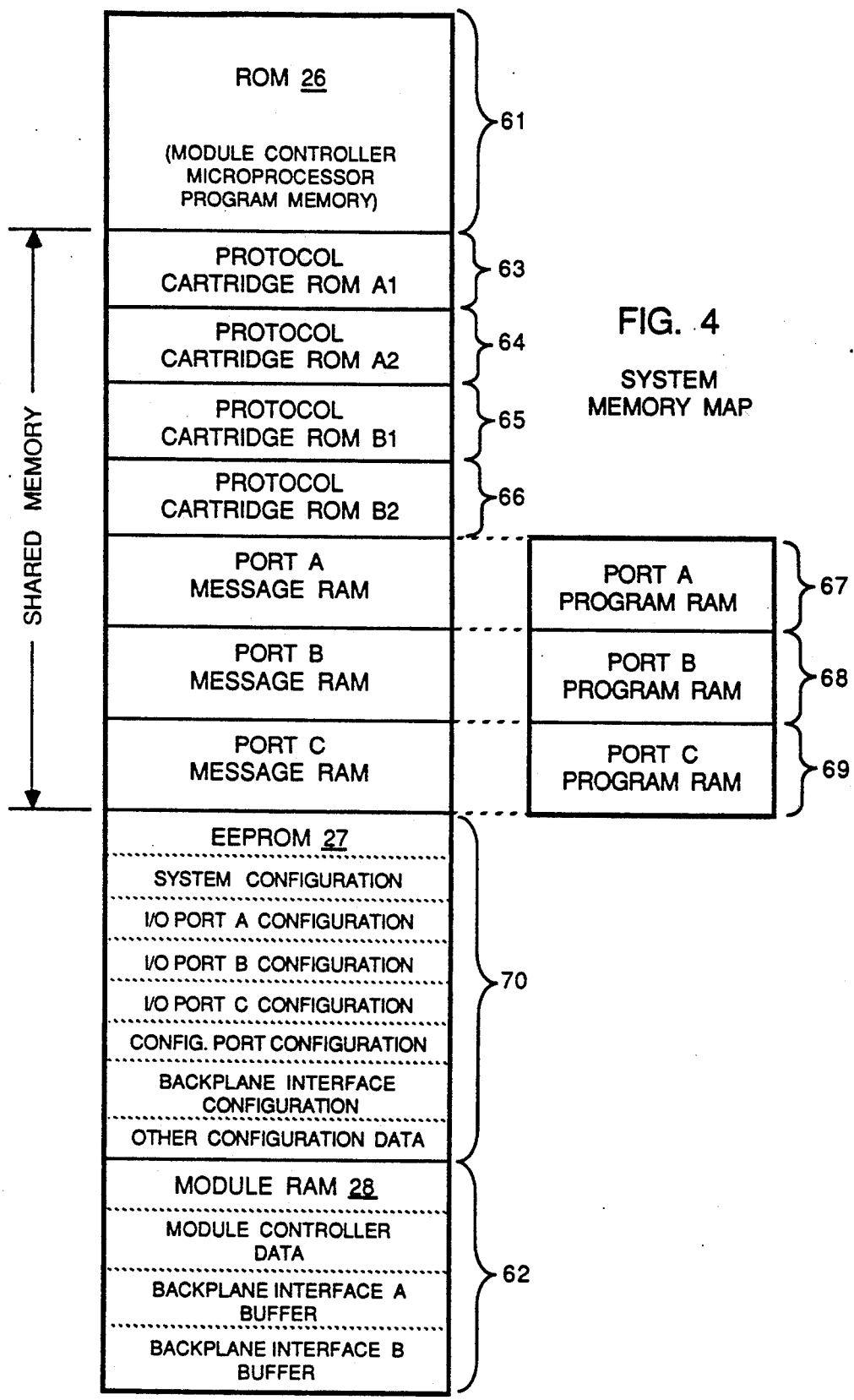
FIG. 4 is a memory map for the serial communication module.

FIG. 4 represents a memory map of all the memory devices in the communication module 15 arranged by the addresses assigned to each. A block of addresses 61 are assigned to the storage locations in ROM 26 which contain a program that is executed by the module controller 24. Another block of addresses 62 correspond to the storage locations in module RAM 8, which is subdivided into sections for holding data for different components of the serial communication module 15. For example, one section is utilized to store constants, variables, intermediate processing results and other data for the module controller 24; while other sections act as buffers for data going to and from the backplane interfaces 54 and 56. Additional sections can be provided as buffers for data going to and from the shared RAM's 32a-c, if requiring the controller 24 to wait for direct access to the RAM's adversely affects the processing. In this case, a background task can be used to transfer the data between the appropriate shared RAM 32a-c and the system RAM 28. Four blocks of addresses 63-66 have been assigned to ROM's A1, A2, B1 and B2 in the protocol cartridges 20a and 20b.

The shared RAM's 32a-c are accessed by the associated I/O port microprocessor 34a-c and by the module controller 24. However, the latter device needs access to the program memory 41 in the shared RAM's only during configuration of the I/O ports. Therefore, in order to conserve address space, the same block of addresses 67-69 are allocated to the two memories (program RAM 41 and message RAM 42) of the shared RAM for each port as illustrated in FIG. 4. A signal level on one of the control lines 60 from the shared RAM controller 40 is toggled to select either the program RAM 41 or the message RAM 42.

A final group of addresses 70 is assigned to the EEPROM 27 to store system configuration data. This data defines module parameters, such as which ROM in which protocol cartridge contains the protocol program for each I/O port A, B and C and port specific parameters, such as baud and serial character length, etc. In addition, configuration data is stored in the EEPROM for the two backplane interfaces 54 and 56. A complete set of system default parameters are stored in the EEPROM by the manufacturer. Default configuration data for each port circuit is transferred from the protocol cartridge into EEPROM 27 as will be described. However, if these default parameters are not acceptable for a particular application, the user can alter the parameters via the terminal 18 connected to the configuration port 19.

Module Configuration

The programming terminal 18 presents the user with a menu of configuration functions from which to choose. One of these functions queries the user to define operating parameters for the communication module as a whole. These parameters, for example, specify which protocol cartridge ROM A1, A2, B1 or B2 contains the protocol program to be executed by each port processor 34a-c. Upon the completion of the system configuration function, the designated protocol programs are transferred into the shared RAM 32a-c for each I/O port 14a-c. Thereafter, the user may select another menu item on terminal 18 to configure the communication parameters (e.g. baud rate, data word length, etc.) for a given I/O port.

One of the key features of the present communication module 15 is the ability to direct the incoming data from an I/O port to one or more I/O points for transmission, in addition to the designated destination which accompanies the data. This feature is referred to herein as an "output matrix" since it can be viewed as a software implementation of a switch matrix with inputs along one axis and outputs along another axis. To invoke the output matrix feature, the user selects the appropriate configuration function on terminal 18 and specifies for each I/O port 14a-c to which other I/O points the data received from that port should be sent. This specification is stored in EEPROM 27 as a look-up table, with an entry for each I/O port. Each bit of the binary data stored at the entries is assigned to an I/O point. A high logic level bit indicates that the incoming data from the I/O port is to be sent to the corresponding I/O point.

Another pair of key features of the communication module is the ability to extract a given byte of data from a received message and to search the message for a defined sequence of data. For both of these functions, configuration parameters must be defined. As these functions are associated with data received through a particular I/O port, the parameters are stored along with the port configuration data in EEPROM 27. These parameters will be described subsequently with respect to the operation of these features.

Figure 5:
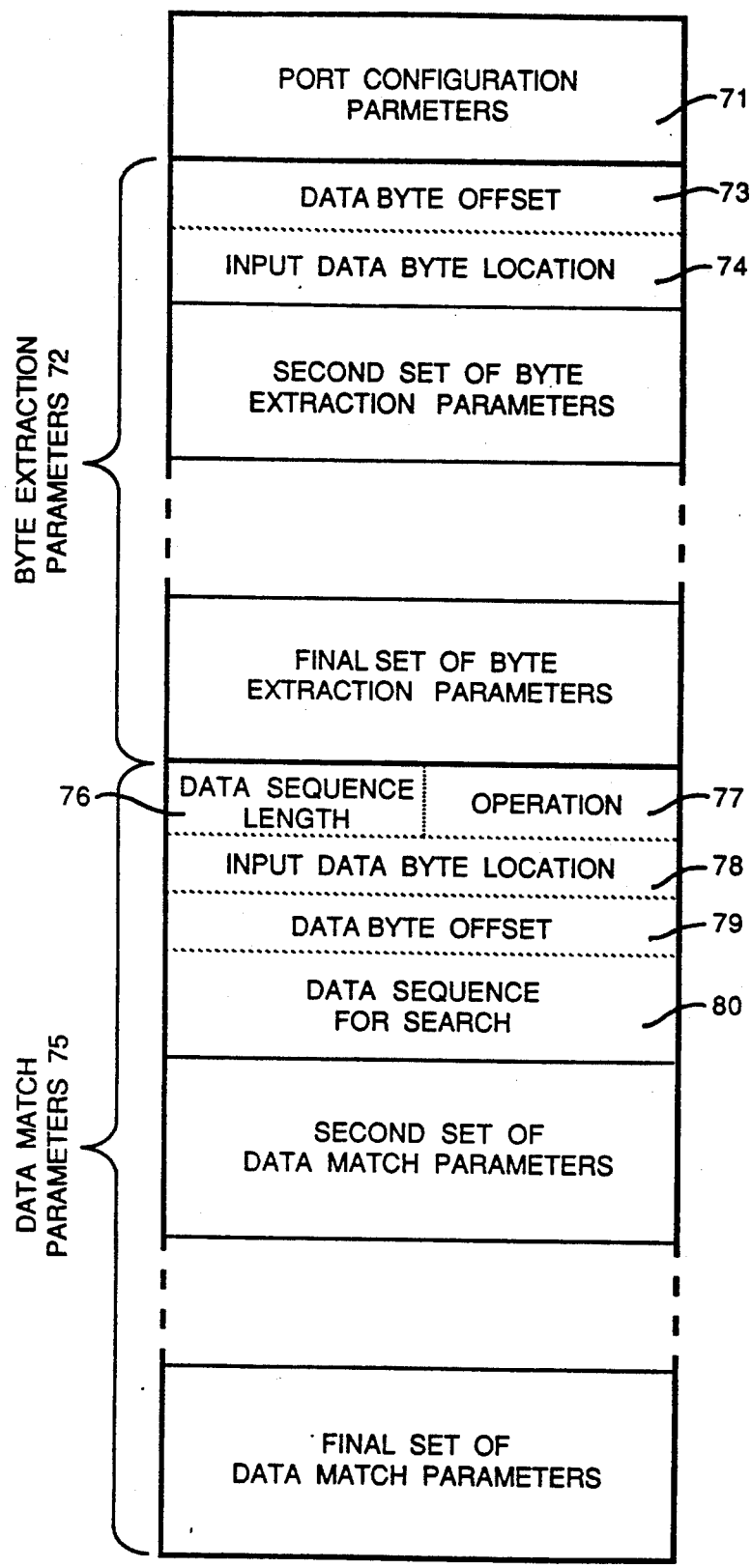
FIG. 5 depicts the structure of data that define the configuration of a port of the module and the processing to be performed on data received through that port.

FIG. 5 depicts the structure of the configuration data that is related to a specific I/O port. As the module has three I/O ports 14a-c, three such data structures exist in EEPROM 27. The first section 71 of the data consists of communication and other parameters which are used by the protocol program to control the transfer of data through the I/O port.

The next section 72 of the data for a port defines the bytes to be extracted from messages received via the port. For example, if the port receives data from an RF tag transceiver, the programmable controller may only need the data contained in the third and sixth bytes of the message data. The bytes to be extracted from the messages coming into the port are defined by a set of parameters 73 and 74. The first parameter 73 provides an offset from the start of the data to a byte to be extracted. The other parameter 74 identifies the location in the program should be stored. As the communication module 15 occupies two slots in the rack, a byte of data from the module can be stored at one of several input data table locations in the processor module 12, which locations correspond to those rack slots. If desired, multiple bytes can be extracted from each message received via this port, in which case other sets of parameters will be stored in section 72 of the port related configuration data.

The remaining section 75 of the port related data specifies one or more sequences of data to be searched for in each incoming data message from the port. Each data sequence to be searched is defined by a set of parameters referred to herein as "data match parameters." The first parameter is a byte 76 which designates the length of the data sequence to be located. In the present embodiment, the sequence can contain up to twenty-four bytes. Another byte of parameter data 77 designates the search operation, and defines whether the sequence must start at a given location in the incoming data (i.e. anchored) or can be located anywhere in the data (i.e. unanchored). Although the present invention is described in terms of these two operations, the scope of the invention is not to be limited to only this set. Other operations can be performed, such as determining whether a defined section of the incoming data is numerically greater than or less than the defined data sequence.

The next field 78 of the data match parameters designates the location in the programmable controller's input data table where the result of the data match operation is to be stored. This word is similar to word 74 for the byte extraction parameters. However, since the data match result is indicated by a single bit (i.e. match or no match), the parameter word 78 also specifics which bit in the input data table location indicates that result. When multiple matches are defined for a given I/O port, different bits indicate the result of each match search. The next parameter field 79 identifies the position of the first byte in the incoming data at which to begin looking for a match of the data sequence in the anchored mode. In the unanchored mode, this field is zero, indicating that the search should start with the first data byte. The final field 80 of the data match parameter block contains the data sequence to be detected and can be up to twenty-four bytes long.

Module Operation

This stored configuration data is utilized when the processor module 12 is in RUN mode and the communication module 15 is exchanging data among the I/O ports and the backplane of rack 11. Specifically, the module controller 24 and each of the I/O port microprocessors 34a-c for the active ports use the configuration data in executing their respective programs.

Figure 6:
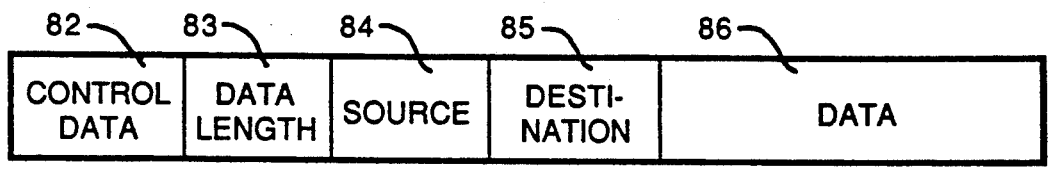
FIG. 6 illustrates the fields of a message packet used to transmit data between components of the communication module.

Data is transferred within the communication module 15 in the form of internal message packets. Such packets are used not only to exchange data among the I/O points, but also among different software tasks executed by the module controller 24. As will be described in greater detail, the functions performed by the module controller 24 are defined by a set of software tasks which are executed separately in a time slice manner. One task routes the internal message packets over the data bus 21, a data manipulation task performs the byte extraction, data match and output matrix functions, and yet another task handles communication via the configuration port 19. Each task has a section of storage locations in the module RAM 28 assigned to receive and send internal message packets of data. The format of the internal message packet is depicted in FIG. 6. The first field 82 of this packet contains control data which aids in routing the packet. For example, this field contains an indication of whether the packet is carrying a command, communication data or configuration data. The length o the data in the packet is specified in the next packet field 3. Then, two fields 84 and 85 follow which contain the source and destination points within the module. As described above, the source and destination points may be an I/O point or a task message storage location in the module RAM 28. The last field 86 of the internal message packet contains the data being transmitted. Alternatively, field 86 could contain a command for the destination device or configuration data.

The use of the internal message packets and the communication module operation as a whole can best be described by tracking the path of an exemplary block of sensor data coming in through I/O port B (14b) from a device 17, for example. The data is received over communication link 16 as part of a serial message frame which conforms to the protocol defined for that link. For example, a typical message frame encloses the sensor data in a field with a header and an end delimiter on either side. However, if the link couples a single sensor or a dumb terminal to the communication module 15, the message frame may consist only of the data field. The port B microprocessor 34b receives the serial packet at its internal UART from the port B driver 36b.

The protocol program executed by the microprocessor 34b processes the serial packet from link 16. In addition to performing functions required by the communication protocol for link 16 (e.g. acknowledging message receipt), the microprocessor strips the sensor data field from the message frame.

The port B microprocessor 34b forms an internal message packet to send the stripped data to the destination point (i.e. an I/O point or a task message memory location) in the module 15. In doing so, the length of the data is computed and combined with the proper set of control bits to form the first two fields 82 and 83 of the internal message packet. The designation of port B is inserted as the source field 84. When port B was configured, a designation was made of the I/O point to which all externally received message data is to be sent. For example, all message data may be configured to be sent to the processor module 12 over the rack backplane. An identification of the designated recipient is inserted in the destination point field 85. Alternatively, a field of the link packet can contain a specification of the destination I/O point in the module which is inserted into field 85. Once the recipient identification has been added, the internal message packet is ready to be sent within the module 15. The completed packet is stored in shared RAM 32b and a flag is set to indicate that the circuit for port B has a message to send.

The exchange of internal message packets is carried out by a routing task which the module controller executes in a time slice manner with other tasks. The routing task and the message transfer technique are similar to that described in U.S. Pat. No. 4,442,504 with respect to exchanging messages across a rack backplane between modules, which description is incorporated herein by reference. In executing the routing task, the destination field is used to determine to which device to send the message. For the exemplary message, the destination is the backplane of rack 11. Therefore, the routing task will store the internal message packet in a queue of backplane messages that is maintained in module RAM 28. A conventional backplane communication task sequentially transmits the message packets in the queue over the backplane via one of the backplane interfaces 54 or 56. This interface 54 or 56 takes over the task of sending the message data across the backplane when interrogated by the processor module 12.

Figure 7:
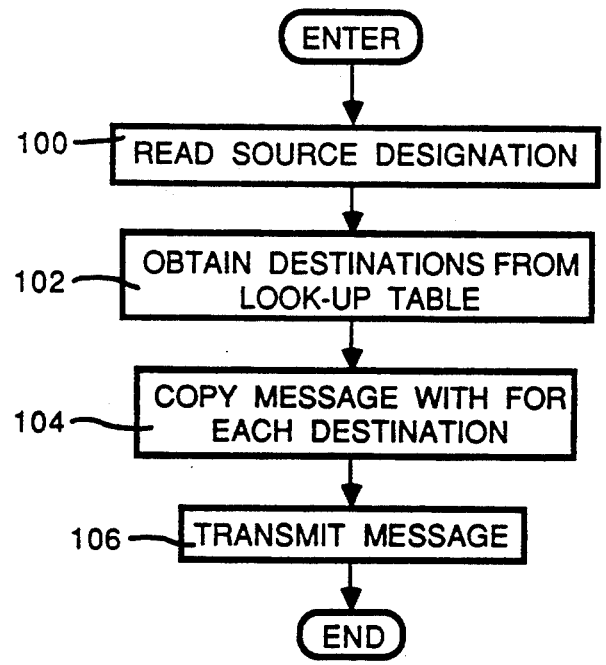
FIG. 7 is a functional flowchart of part of a software task which routes messages in the communication module.

The routing task also performs the output matrix operation, the functional steps of which are depicted in Figure 7. The source field 84 of the internal message packet is read by the module controller 24 at step 100 and used to access an output matrix at step 100. The output matrix is in the form of a look-up table with the byte in the packet source field 84 being used to index to an entry in the table which corresponds to the I/O port circuit that sent the message packet (e.g. port circuit B). Each bit of the entry corresponds to an I/O point of the communication module. During configuration of the output matrix, the user specifies which I/O points are to receive the data received via each I/O port 14a-c, in addition to the destination indicated by the port configuration parameters. For instance, all data received at I/O port B (14b) may be defined to go to the host computer coupled to I/O port C (14c). In this case, the bit corresponding to I/O port C would be set to a high logic level in the look-up table entry for I/O port B.

The entry for port B in this example is read at step 102 and a copy of the internal message packet is made at step 104 for each I/O point designated. In making the copy, the module controller 24 places an identification of the I/O point in the destination field 85. A copy of the internal message packet also is placed in a section of module RAM 28 designated to hold or packets if multiple I/O points are designated in the look-up table, then are transferred by the module controller 24 at step 106 and the routing task ends.

Figure 8A:
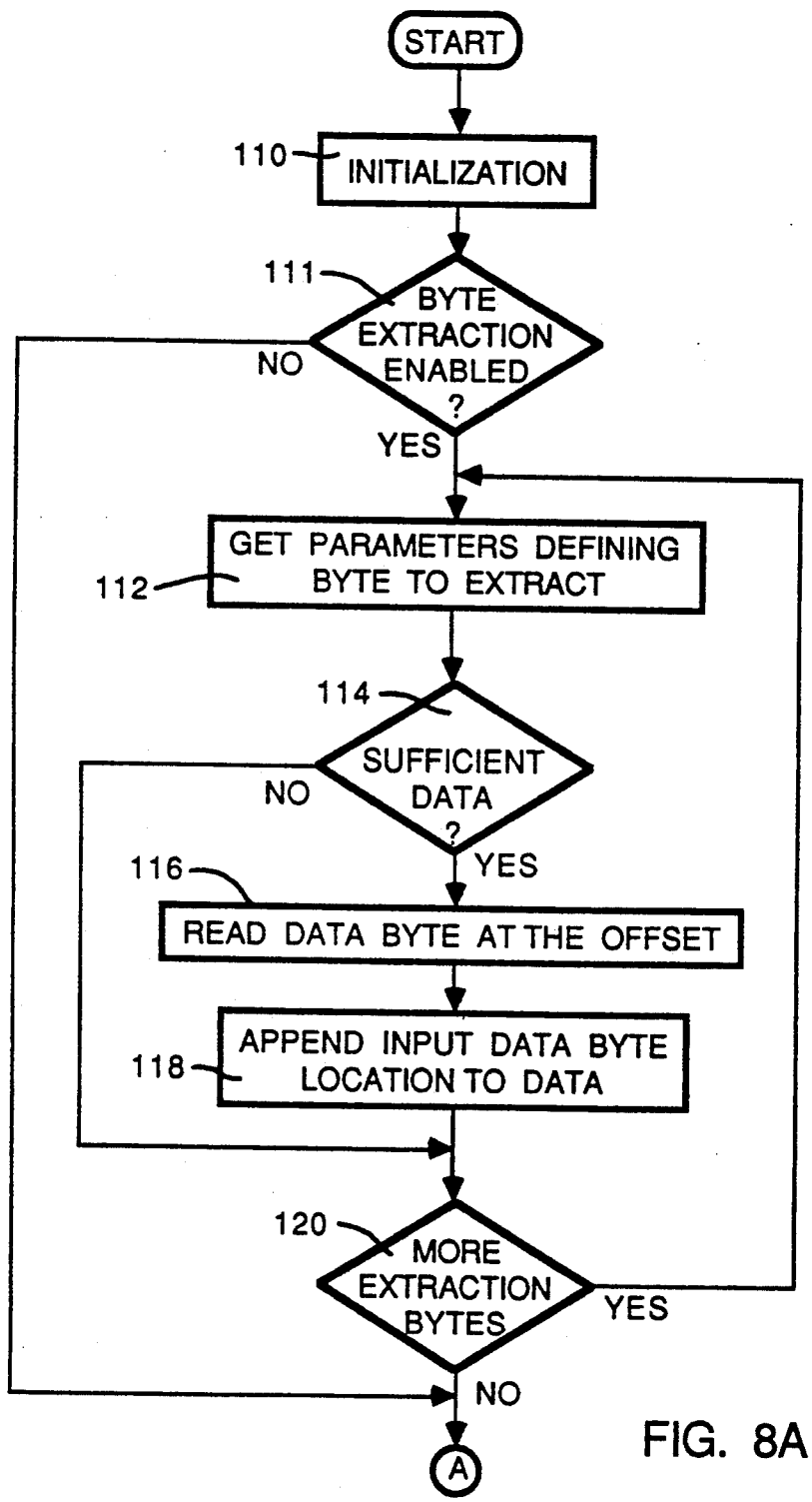
FIGS. 8A and 8B are a functional flowchart of software routines which process data received by the module.
Figure 8B:
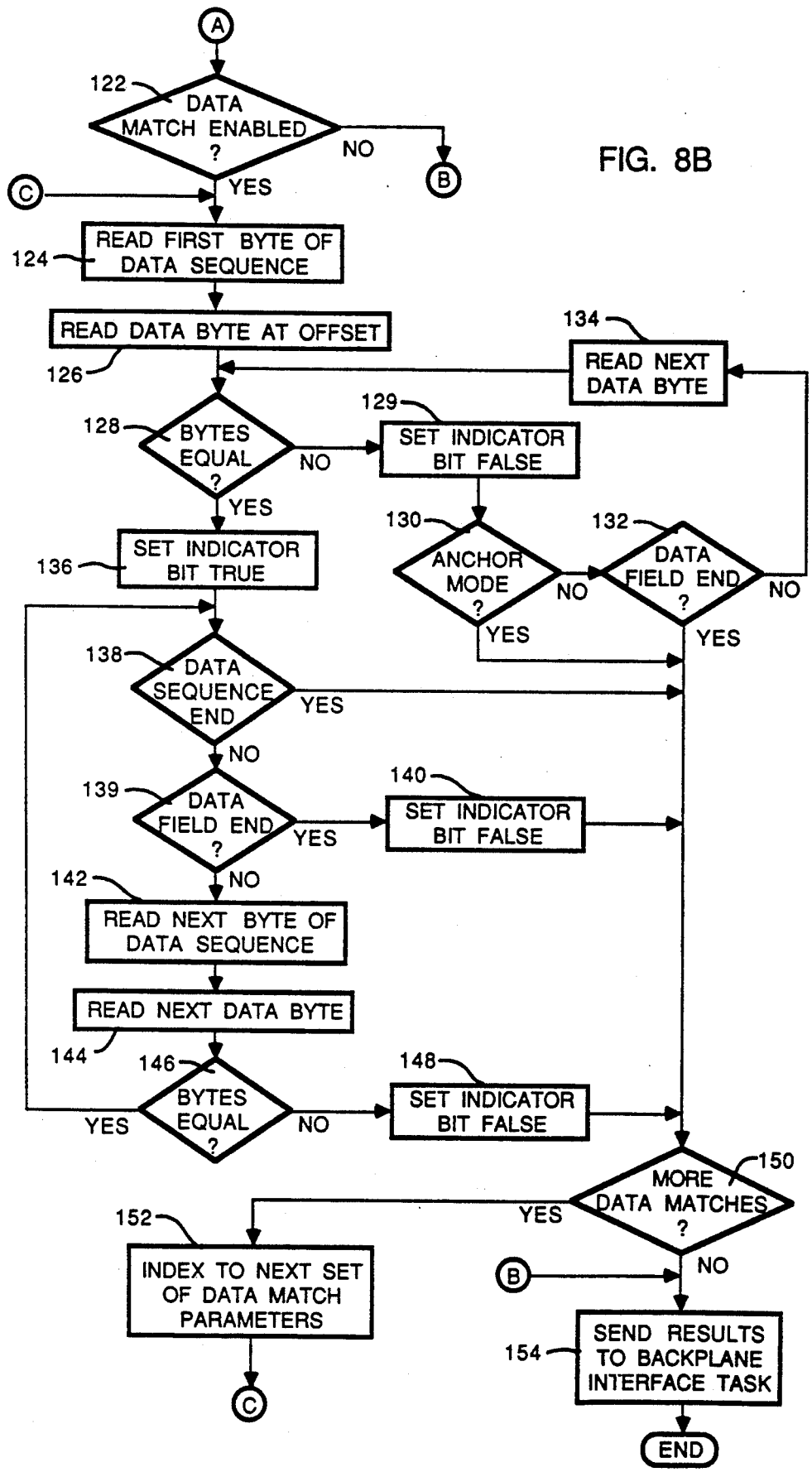

With reference to FIGS. 8A and 8B, when a message packet is stored in the section of module RAM 28 assigned to the data manipulation task, the task begins by initializing its variables and counters at step 110. The data manipulation task then enters the section which performs the byte extraction. Initially, the module controller 24 inspects the port configuration data stored in parameter block 72 (FIG. 5) to determine if the byte extraction function has been enabled for this port. If byte extraction is not enabled, the execution of the data manipulation task jumps from step 111 to step 122 bypassing the portion of the task relating to that function. However, if byte extraction is enabled, the program execution advances to step 112 where the first set of byte extraction parameters are obtained from the port configuration data stored in EEPROM 27. The module controller 24 then compares the data byte offset from field 73 of the parameters with the data length field of the internal message packet being processed. This comparison determines whether the data field in the message packet is long enough to contain a byte at the prescribed offset. If the data is not long enough, the program execution jumps from step 114 to step 120. Assuming that the data field is long enough, the program execution advances to step 116 where the offset is used to read the designated byte in the data field of the internal message packet from the I/O port 14. The module controller 24 then assigns this byte to the input data byte location obtained from field 74 of the byte extraction parameters. This extracted data then is saved for later creation of another internal message packet transmitting the results of the data manipulation.

The program execution then advances to step 120 where the byte extraction parameter section of the port configuration data is checked to determine if more bytes remain to be extracted. If so, the program execution returns to step 112 where the next byte is extracted from the internal message packet. When the last byte has been extracted, the program execution advances from step 120 to step 122 on FIG. 7B.

At this juncture, the data manipulation task enters a section which performs the data match operation on the data contained in the internal message packet being processed. At the commencement of this section, the module controller 24 checks the port configuration data to determine if the data match function has been enabled for the port designated in the source field of the internal message packet. If this function is not enabled, the execution of the task jumps to step 154; otherwise, the execution advances to step 124. At step 124, the module controller 24 reads the first byte of the data sequence stored in field 80 of the data match parameter block 75. Then, the data stream offset byte in field 79 is used to index to and read the byte of the internal message packet at step 126. These two bytes are then compared at step 128 to determine if the first byte of the data sequence has been found in the message packet. If the bytes are not identical, the program execution branches to step 129. At this step, a bit specified by the data match parameter field 78 is set to a false indication to record the comparison result.

Next, the operation designated in parameter field 77 is checked at step 130 to determine if the data match is to operate in the anchor mode. In this mode, the data sequence must start at the location designated by the data byte offset in parameter field 79. It should be noted that this offset will be zero if the unanchored mode is active. If the first byte of the sequence does not match in the anchored mode, the data sequence has not been found and the program execution jumps to step 150.

However, if the anchor mode has not been selected, indicating that the data sequence can be located anywhere in the data field 86 of the internal message packet, the program execution branches to step 132. At this point, a determination is made whether the last relevant byte of this data field (as designated by the configured data sequence length 76) has been inspected, in which case the search terminates by jumping to step 150. However, if another byte of the message packet remains to be inspected, the program execution branches from step 132 to step 134 where the next byte of the data field in the internal message packet is read for comparison to the first byte of the data sequence at step 128. Therefore, in the unanchored mode, the program continues to loop through steps 128-134 until either the first byte of the data sequence is found or the configured end of the relevant portion of the packet's data field is encountered.

If the comparison performed at step 128 determines that the two bytes are equal, the data manipulation task execution advances to step 136 where the comparison result indicator bit, specified by the input data byte parameter field 78, is set true. The module controller 24 then checks to determine whether the last byte of the data sequence has been compared to the incoming data at step 138. If the comparison is complete, the program execution branches to step 150. However, if additional bytes of the data sequence remain to be compared, the program execution advances to step 139 where a determination is made whether the end of the data field 86 in the internal message packet has been encountered. If the end of the data field has been found before the end of the data sequence, the bit which indicates the result of the data match operation is set false at step 140 before the execution advances to step 150.

However, if additional bytes remain in both the data sequence and the data field of the internal message packet, the next byte of the data sequence is obtained at step 142 and the next byte of data from the message packet is obtained at step 144. These two new bytes are then compared by the module controller 24 at step 146, and if found to be equal, the program loops back to step 138 to determine if additional bytes remain to be compared. However, if the new pair of bytes are not equal at step 146, the indicator bit for the operation result is set false at step 148 and the execution advances to step 150.

When the data manipulation task execution reaches step 150, the data match operation for one set of data sequence parameters has been completed with the designated bit in the processor module's input data byte indicating the result of that data match operation. At step 150, a determination is made whether additional sets of data match parameters remain in the port configuration data. If an additional set exists, a program execution branches to step 152 where a parameter pointer is indexed to the next set in memory block 75 before returning to step 124 to perform the data match operation for the next data sequence.

On the other hand, if additional sets of data match parameters are not found at step 150, the data manipulation task execution advances to step 154. At this point, the results of both the byte extraction and the data match operations are combined into an internal message packet which is then sent via the routing task to the backplane interface task. This latter task transmits the results on the rack backplane upon interrogation of the communication module 15 by the processor module 12. Once the results of the data manipulation have been stored for transmission to the backplane interface task, the execution of this task ends.

We claim:

1. In a programmable controller having a processor module and a number of functional modules located in a rack and electrically interconnected by a backplane of the rack; a communication module for interfacing the programmable controller to external devices via a plurality of communication links, said communication module comprising:

a plurality of ports including a plurality of link ports with each link port coupling one of the communication links to the communication module, and a backplane port coupling the communication module to the backplane of the rack;

a mechanism separate from the programmable controller, by which a user of the programmable controller is able to provide for each link port a designation of one or more of said plurality of ports to which messages are to be sent;

a first memory means, connected to said mechanism, for storing the designation for each link port; and means for transferring the messages received through a given link port to one or more ports as defined by the designation stored in said first memory means for that given link port.

2. The communication module in claim 1 further comprising:

a second memory means for storing a definition of a section within a data field of a message to be received through one of said plurality of link ports, the section containing a plurality of data characters;

a means, coupled to said second memory means, for extracting the defined section from the data field of a message received through the one of said plurality of link ports; and means, responsive to said means for extracting, for transmitting the extracted section of the data field through the backplane port.

3. The communication module as recited in claim 2 wherein said means for transmitting sends the extracted section of data to the processor module via the backplane port.

4. The communication module as recited in claim 1 further comprising:

a second memory means for storing data specifying a user defined sequence of data having a plurality of data characters, and one of said plurality of link ports through which the sequence of data is expected to be received;

a means, coupled to said second memory means, for searching within messages received through the one of said plurality of link ports for the user defined sequence of data; and means for signalling the processor module with an indication that the user defined sequence of data was found within a given message.

5. The communication module as recited in claim 4 wherein said means for signalling sends the indication to the processor module via the backplane port.

6. The communication module as recited in claim 1 further comprising:

a second memory means for storing data specifying a user defined sequence of data having a plurality of data characters, and one of said plurality of link ports through which the sequence of data is expected to be received; and a means, coupled to said second memory means, for comparing at least a portion of a message received through the one of said plurality of link ports to the user defined sequence of data and producing an indication of the result of the comparison.

7. The communication module as recited in claim 6 further comprising means for sending the indication of the result of the comparison to the processor module via the backplane port.

8. The communication module as recited in claim 1 wherein one of the plurality of link ports includes a means for generating a message packet containing a message received from said means for transferring, which message packet conforms to a protocol of the communication link coupled to that one link port and the message packet then is transmitted over to the communication link coupled to that one link port.

* * * * *

UNITED STATES PATENT AND TRADEMARK OFFICE
CERTIFICATE OF CORRECTION

PATENT NO. : 5,307,463

DATED : April 26, 1994

INVENTOR(S) : Craig S. Hyatt et al.

It is certified that error appears in the above-identified patent and that said Letters Patent is hereby corrected as shown below:

In column 6, line 34, change the filing date of the application to Sep. 23, 1988.

In column 7, line 3, change "RAM 8" to --RAM 28--.

In column 7, line 12, insert "module" after "the".

In column 8, line 39, replace the text with --in the programmable controller's input data table where the extracted byte should be stored. As the communication--.

UNITED STATES PATENT AND TRADEMARK OFFICE
CERTIFICATE OF CORRECTION

PATENT NO. : 5,307,463
DATED : April 26, 1994
INVENTOR(S) : CraigS. Hyatt et al

It is certified that error appears in the above-indentified patent and that said Letters Patent is hereby corrected as shown below:

In column 9, lines 5 and 6, change "specifics" to --specifies--.

In column 9, line 47, change "3" to --83--.

In column 11, line 4, replace the text with --module RAM 28 designated to hold data for processing by the data manipulation task, The packet, or packets if multi--.

Signed and Sealed this

Sixth Day of September, 1994

Attest:

BRUCE LEHMAN

Attesting Officer     Commissioner of Patents and Trademarks